United States Patent [19]

McKeown

[11] 4,060,762
[45] Nov. 29, 1977

[54] BIMODAL CAVITY RESONATOR BEAM POSITION MONITOR

[75] Inventor: Joseph McKeown, Deep River, Canada

[73] Assignee: Atomic Energy of Canada Limited, Ottawa, Canada

[21] Appl. No.: 746,158

[22] Filed: Nov. 30, 1976

[30] Foreign Application Priority Data

May 17, 1976 Canada .................................. 252671

[51] Int. Cl.$^2$ ............................................ G01N 27/00
[52] U.S. Cl. .............................. 324/71 EB; 324/58 C; 333/83 R
[58] Field of Search .............. 324/71 EB, 58 R, 58 A, 324/58 C, 58.5 R, 58.5 A, 58.5 C, 95; 333/83

[56] References Cited

U.S. PATENT DOCUMENTS

| | | | |
|---|---|---|---|
| 3,541,439 | 11/1970 | Shriver | 324/71 |
| 3,581,190 | 5/1971 | Brown | 324/58.5 X |
| 3,609,520 | 9/1971 | Sneed, Jr. | 333/83 X |
| 3,612,858 | 10/1971 | De Parry | 324/71 EB X |
| 3,909,713 | 9/1975 | Billeter | 324/58.5 C |

Primary Examiner—Rudolph V. Rolinec
Assistant Examiner—Vincent J. Sunderdick
Attorney, Agent, or Firm—Edward Rymek

[57] ABSTRACT

A charged particle beam position monitor having a resonant cavity which is excited in a first mode if the monitored beam passing through it is displaced along the x-axis, and is excited in a second mode orthogonal to the first if the monitored beam passing through it is displaced along the y-axis. These modes are tuned to the same frequency and may be independently detected. The X and Y coordinates of the beam are determined by the amplitude and phase of the detected first and second orthogonal modes respectively.

5 Claims, 8 Drawing Figures

BIMODAL CAVITY RESONATOR BEAM POSITION MONITOR

The invention is directed to a charged particle beam position monitor and in particular to a non-intercepting monitor using a single bimodal resonant cavity in which uncoupled orthogonal modes are simultaneously excited by the particle beam.

In the operation of beam current devices such as charged particle accelerators, it is highly desireable to monitor the position of the beam generated to allow functions such as focussing of the beam to be achieved with high accuracy. Also fast shut-down systems require information quickly if a power beam starts to drift off course. Most devices presently in use for determining beam position are of the intercepting type which tend to perturb the beam during the monitoring process. Many provide information only on the beam halo which surrounds the hard core of the beam. In addition, in monitoring high power beams, heat dissipation, the emission of unwanted radiation and activation of components can create problems.

It is therefore an object of this invention to provide a charged particle beam monitor which detects the position of the charged centroid of the beam.

It is another object of this invention to provide a beam position monitor which does not intercept or perturb the particle beam.

It is a further object of this invention to provide a beam position monitor which is sensitive to the phase distribution of the beam.

It is another object of this invention to provide a beam position monitor which is simple to construct and operate.

These and other objects are achieved in a charged particle beam monitor which consists of a bimodal cavity, resonant, at the beam frequency or a harmonic thereof.

The cavity includes beam holes, which are concentric with the z-axis passing through the x and y axes of the cavity, on opposite surfaces to allow the particle beam to pass through the cavity to excite the cavity in a first mode if the beam is displaced along the x-axis and in a second mode orthogonal to the first if the beam is displaced along the y-axis. The cavity further includes tuning means, such as capacitive tuning screws mounted in the cavity wall at the potential maxima of the modes, to tune the two modes to the same frequency. Detectors such as magnetic probes symmetrically positioned around the circumference of the cavity on the x and y axes, are coupled to the fields in the two modes and provide signals which are a function of the displacement of the centroid of the beam along the x and y axes respectively. The x and y coordinates of the beam centroid may be provided by determining the average amplitude and phase of the probe signals for the x-axis and the y-axis respectively, and converting the amplitudes to distances along the axes using a Bessel function.

Figure 1A:
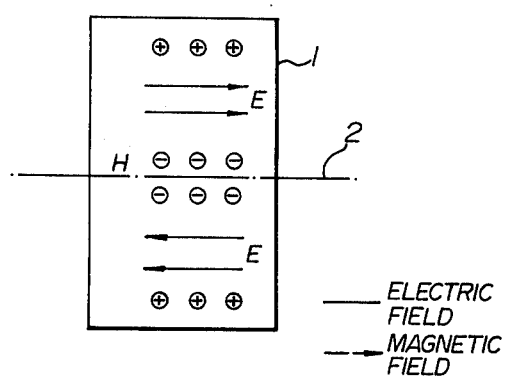
FIGS. 1a and 1b illustrate the $TM_{110}$ mode oscillation in a right circular cavity.
Figure 1B:
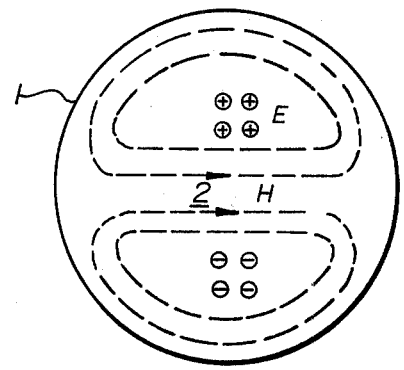

Rf oscillations in a cavity resonator can occur in many ways with each type of oscillation having particular resonant frequency. The representations of the magnetic H and electric E field distributions of a $TM_{110}$ mode of a right circular cylindrical cavity 1 are shown in FIGS. 1a and 1b. A charge particle beam travelling slightly off the axis 2 through the cavity 1 can excite this mode by interaction with the electric field of the mode. With sufficient beam current, the cavity fields can be built up to such a level that beam blow-up results due to the high magnetic field on axis 2, as described in the reference: Gluckstern, R. L., Proc. of MURA Conf. on Linear Acc., BNL-AADD-38 (1964) 186.

In the $TM_{110}$ mode the electric field is zero on axis 2 and its direction changes sign across the plane of symmetry. Also it increases to a maximum at 0.44 R where R is the cylinder radius of the cavity 1. When the beam current is known the amplitude of the cavity oscillations can be interpreted to give the displacement from the plane of symmetry while the phase will give the sign of the displacement.

Figure 2:
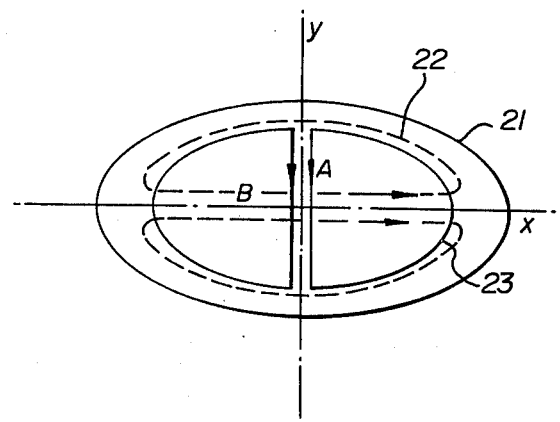
FIG. 2 illustrates the breakup of the $TM_{110}$ mode in an elliptical cavity.

In practice, any departure from azimuthal symmetry represents a perturbation to the cavity fields causing modes to split into components having similar field patterns but different resonant frequencies. As described in the reference: Chu, L. J., Journal of Applied Physics 9 (1938) 583, Chu has shown that for an elliptical cavity, modes with azimuthal asymmetry in their field distributions will break up into two orthogonal component modes having different resonant frequencies. The magnetic field lines 22 and 23 for the two orthogonal $TM_{110}$- like modes in an elliptical cavity 21, are represented in FIG. 2. The figure shows that the magnetic field lines 22 and 23 close to the axis of the cavity 21 orient themselves along the major or x-axis and minor or y-axis, respectively.

Maximum electric field positions for the major and minor modes occur at positions A and B respectively. Using the criteria published by Slater in the reference: Slater, J. C., Microwave Electronics, Van Nostrand, Princeton, N.J. (1950) p. 81, it is possible to introduce a tuning plunger at positions A and B which will lower the resonant frequency of each mode independently. This principle has been used in paramagnetic resonance studies in diamond to continuously split the degenerate $TM_{110}$ modes over a continuous frequency range, as described in the reference: Sorokin, P. P. et al, Physical Review 118, no. 4 (1960) pages 939 to 945.

Figure 3:
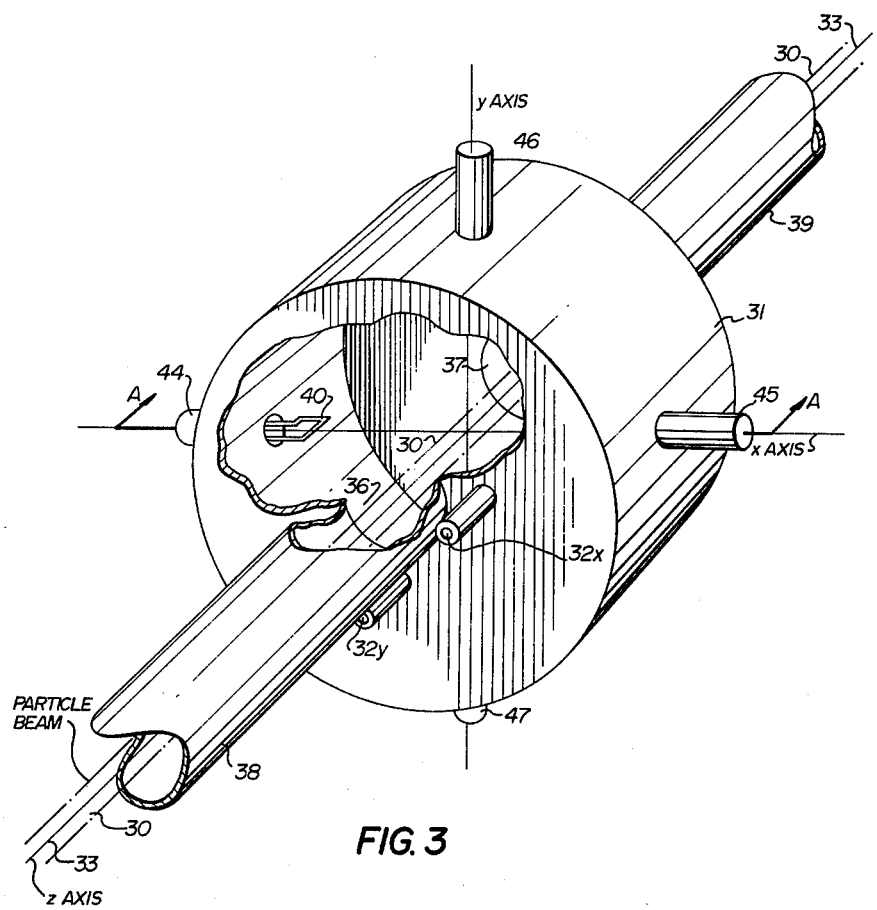
FIG. 3 illustrates the beam position monitor in accordance with this invention.
Figure 4:
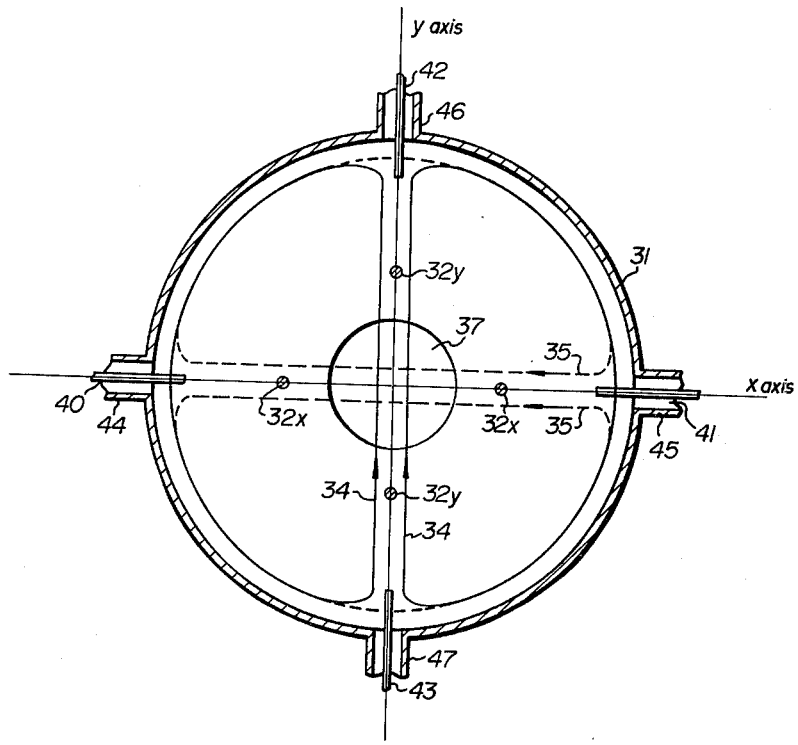
FIG. 4 illustrates a cross-section of the monitor in FIG. 3.

The preferred embodiment of the beam monitor in accordance with this invention is illustrated in FIGS. 3 and 4. The monitor includes a bimodal right circular cavity 31 having a first and a second pair of symmetrically arranged capacitive tuning screws 32x and 32y projecting into the cavity 31. The first pair of tuning screws 32y are positioned on either side of the cavity axis 33 on the x-axis at the electric field maxima of a first cavity mode having magnetic field lines 34. The second pair of tuning screws 32y are positioned on either side of the cavity axis 33 on the y-axis at the electric field maxima of a second cavity mode which is orthogonal to the first mode and has magnetic field lines 35. The tuners 32x, 32y may be made of stainless steel and made to penetrate the cavity through glass windows to protect the vacuum integrity of the cavity 31.

The beam monitor also includes beam holes 36 and 37 on the front and back surfaces respectively of the cavity 31 to allow passage of the charged particle beam 30 to be monitored through the cavity 31, the beam holes 36 and 37 being concentric with the cavity axis 33. In order to further maintain the vacuum integrity of the cavity 31, a first beam pipe 38 may be used to connect the cavity 31 to the beam accelerating system and a second beam pipe 39 may be used to connect the cavity 31 to a utilization means, such as a target or another accelerating structure.

The beam monitor further includes four symmetrically positioned magnetic probes 40, 41, 42, and 43 around the outer circumference of cavity 31. These probes having a housing 44, 45, 46 and 47 to maintain the vacuum in cavity 31. Probes 40 and 41 are preferably positioned on the x-axis such that only magnetic lines 34 will be coupled to these probes, while probes 42 and 43 are positioned on the y-axis to couple orthogonal magnetic lines 35. Each probe is thus oriented to strongly couple to one mode but not to the orthogonal mode, hence an opposite pair of probes 40 and 41 is isolated from the other pair of probes 42 and 43, with isolation between the modes being greater than 40db.

In operation, the cavity 31 is constructed to be resonant at the accelerator frequency or at a harmonic thereof and both modes of the cavity 31 are tuned to the same frequency by tuning screws 32x and 32y.

Figure 5A:
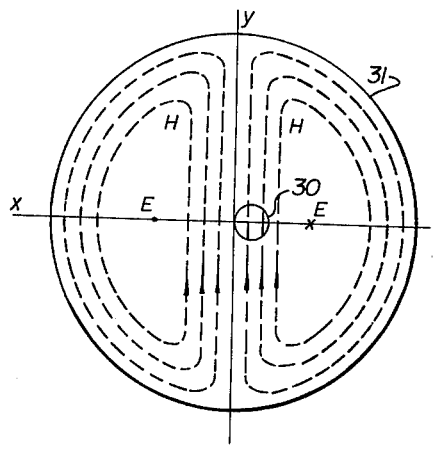
FIGS. 5a and 5b illustrate the modes excited in the monitor depending on the displacement of the beam.
Figure 5B:
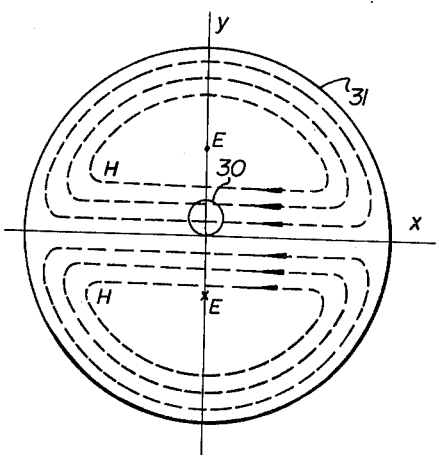
Figure 6:
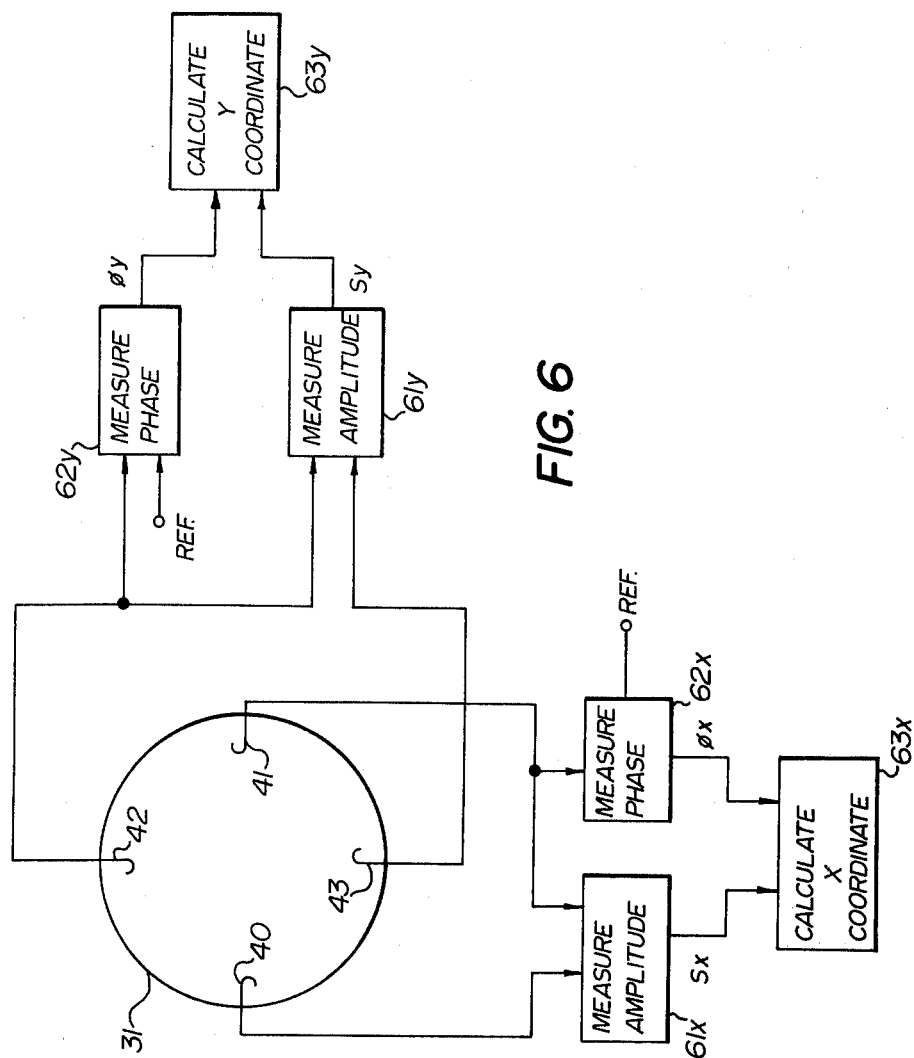
FIG. 6 illustrates the coordinate determining circuitry.

As shown is FIGS. 5a and 5b, a charged particle beam 30 passing through the bimodal cavity 31 will excite the modes appropriate to the cartesian coordinates of the beam centroid. Thus if the beam 30 is displaced along the x-axis as shown in FIG. 5a, one mode of the cavity 31 will be excited and will be detected by probes 40 and 41. If the centroid of the beam 30 is to the left of the y-axis, the same mode will be excited with the electrical field lines E and magnetic field lines H running in directions opposite to those shown. Probes 40 and 41 are coupled to an amplitude measuring circuit 61 in the beam coordinate determining circuit shown in FIG. 6. Circuit 61 provides an output $S_x$ which is the average of the amplitudes of the signals from probes 40 and 41. In addition, oneof the probes 40 or 41, in this instance probe 41, is coupled to a phase dtermining circuit 62 which provides a plus or minus output signal $\phi_x$ depending on the phase of the probe 41 signal with respect to a reference. This plus or minus signal indicates whether the beam is to the left or the right of the y-axis. The outputs from circuits 61 and 62 are coupled to a coordinate calculating circuit 63. Circit 63 calculates the position x of the centroid of beam 30 using the equation:

$$x = 0.037 + 0.38S$$

For greater accuracy either the $J_1$ Bessel function or the following expression may be used:

$$x = 0.00039 + 0.507S - 0.019S^2 - 0.047S^3$$

Thus circuit 63 provides both the distance and direction of the centroid of the beam 30 along the x-axis.

Similarly, if the beam 30 is displaced along the y-axis as shown in FIG. 5b, the orthogonal mode of the cavity 31 will be excited and will be detected by probes 42 and 43. Probes 42 and 43 are coupled to an amplitude measuring circuit 61y, with probe 42 additionally coupled to a phase determining circuit 62y. Circuits 61y and 62y are identical to circuits 61x and 62x respectively, and provide output signals $S_y$ and $\phi_y$ which are coupled to a y-coordinate calculating circuit 63y which is identical to circuit 63x.

Generally, the centroid of the beam 30 will be displaced both along the x-axis and the y-axis, and thus both orthogonal modes will be excited simultaneously and the x and y coordinates of the beam 30 will be simultaneously provided by circuits 63x and 63y.

By constructing the cavity 31 at a harmonic of the accelerator frequency, information on the phase distribution of the bunched particle beam 30 may be obtained. If the accelerator generating the beam 30 is expected to have beam bunches of width less than 60° the cavity may be constructed to resonate at the third harmonic. Thus if the phase distribution of the beam 30 is 120°, then the monitor would be very insensitive to the third harmonic but sensitive to the second harmonic. The maximum sensitivity will be achieved when $n\Phi = \pi$ where $n$ is the harmonic number and $\Phi$ represents the limits of phase at the fundamental frequency. For example, if the beam 30 to be monitored is generated by an accelerator at a frequency of 805 MHz and the bunched beam is distributed in longitudinal phase space over a range of 60° at 805 MHz, to obtain maximum sensitivity the cavity 31 would be constructed to resonate at 2,415 MHz or the third harmonic. Such a cavity 31 could be 14.75 cms. in diameter and 6 cms. long with beam holes having a diameter of 3.5 cms.

1. A charged particle beam position monitor comprising:
    resonant cavity means capable of being excited in a first mode about the x-axis of the cavity means and in a second mode orthogonal to the first mode about the y-axis of the cavity means, said cavity means having beam holes in opposite surfaces of said cavity means, said beam holes being concentric with a z-axis through the intersection of the x-axis and y-axis, to allow the particle beam to pass through said cavity means such said first mode is excited in the cavity when the centroid of the beam is displaced along the x-axis and said second mode is excited in the cavity when the centroid of the beam is displaced along the y-axis;
    tuning means mounted on said cavity means for tuning the orthogonal modes to the same frequency;
    first detector means coupled to said first mode in said cavity means to provide a signal as a function of beam displacement along the x-axis; and
    second detector means coupled to said second mode in said cavity means to provide a signal as a function of beam displacement along the y-axis.

2. A beam position monitor as claimed in claim 1 wherein said first and second detector means each include two magnetic probes, the first detector probes being located at opposite sides of said cavity on the x-axis and the second detector probes being located at opposite sides of said cavity on the y-axis.

3. A beam position monitor as claimed in claim 2 which further includes:
    first amplitude measuring means coupled to said first detector probes for determining the average amplitude of the signals from the first detector probes;

first phase measuring means coupled to one of said first detector probes for determining the phase of the signal from the first detector probe;

first means coupled to said amplitude measuring means and first phase measuring means for providing the x coordinate of the beam;

second amplitude measuring means coupled to said second detector probes for determining the average amplitude of the signals from the second detector probes;

second phase measuring means coupled to one of said second detector probes for determining the phase of the signal from the second detector probe; and second means coupled to said second amplitude measuring means and said second phase measuring means for providing the y coordinate of the beam.

4. A position monitor as claimed in claim 1 wherein said tuning means includes four capacitive tuning screws positioned at the electric field maxima of said orthogonal modes.

5. A position monitor as claimed in claim 4 wherein said cavity means consists of a right circular cavity resonant at a harmonic of particle beam frequency.

* * * * *